Figure 1:
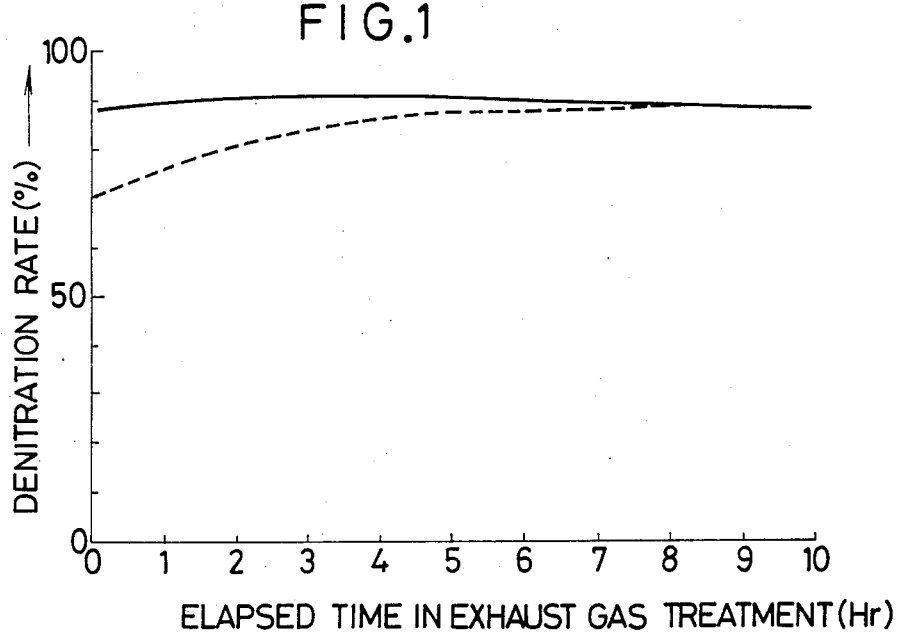

United States Patent [19]

Iida et al.

[11] Patent Number: 4,656,147

[45] Date of Patent: Apr. 7, 1987

[54] METHOD FOR RECOVERING DENITRATING CATALYST FOR AMMONIA CATALYTIC REDUCTION

[75] Inventors: Kozo Iida; Tsuneo Nagano; Naruo Yokoyama; Yoshiaki Obayashi; Shigeaki Mitsuoka, all of Hiroshima, Japan

[73] Assignee: Mitsubishi Jukogyo Kabushiki Kaisha, Tokyo, Japan

[21] Appl. No.: 719,304

[22] Filed: Apr. 3, 1985

[30] Foreign Application Priority Data

| Apr. 5, 1984 | [JP] | Japan | 59-66794 |
| Apr. 5, 1984 | [JP] | Japan | 59-66795 |
| Apr. 5, 1984 | [JP] | Japan | 59-66796 |
| Apr. 5, 1984 | [JP] | Japan | 59-66799 |

[51] Int. Cl.$^4$ ............... B01J 21/20; B01J 38/66; B01J 38/60; B01J 8/00
[52] U.S. Cl. ................... 502/26; 423/239; 502/22; 502/27; 502/28; 502/34; 502/515

[58] Field of Search ................. 502/26–28, 502/34, 38, 515, 517, 25, 309, 22; 423/239 A

[56] References Cited

U.S. PATENT DOCUMENTS 4,003,711 1/1977 Hishinuma et al. ............ 423/239 A
4,107,272 8/1978 Mori et al. .................... 423/239 A

FOREIGN PATENT DOCUMENTS 27091 3/1977 Japan ............................. 502/515
2124606 2/1984 United Kingdom .............. 423/239

Primary Examiner—P. E. Konopka
Attorney, Agent, or Firm—Holman & Stern

[57] ABSTRACT

A method for recovering a denitrating catalyst for ammonia catalytic reduction which is characterized by treating the denitrating catalyst for ammonia catalytic reduction, in which a performance has deteriorated, with at least one selected from the group consisting of $SO_4{}^{2-}$ compounds, sulfur compounds and sulfonic acid compounds in order to replenish the catalyst with a sulfur content.

5 Claims, 7 Drawing Figures

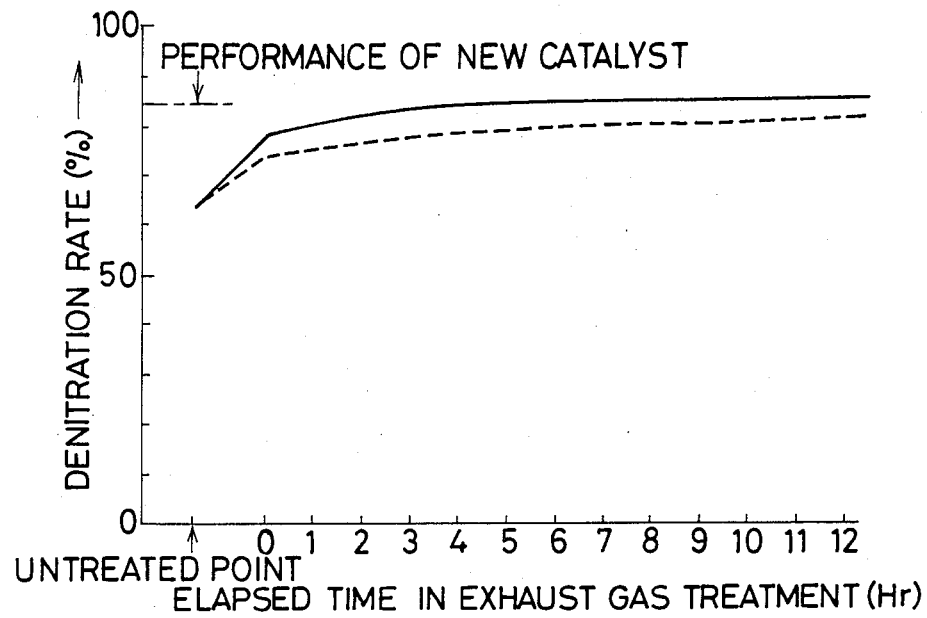
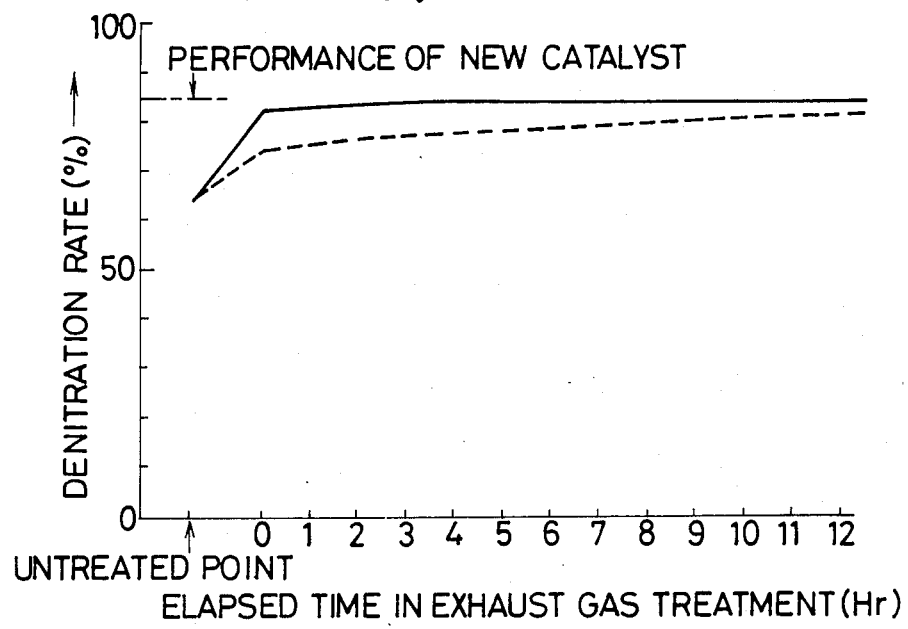

METHOD FOR RECOVERING DENITRATING CATALYST FOR AMMONIA CATALYTIC REDUCTION

The present invention relates to a method for recovering a denitrating catalyst for ammonia catalytic reduction which is used to treat a combustion exhaust gas such as an exhaust gas from a boiler.

As a method for removing nitrogen oxides (hereinafter simply referred to as NOx) from a combustion exhaust gas, there has widely employed an ammonia catalytic reduction system in which NOx is reduced with a catalyst by the use of ammonia as a reducing agent.

When a dust is contained in the combustion exhaust gas, a honeycomb, cylindrical or platelike catalyst is disposed in parallel with a stream direction of the exhaust gas for the purpose of preventing the catalyst from being clogged with the dust during operation, and at present, such a consititution has been mainly taken. In particular, the perforated honeycomb catalysts having hexagonal, square, rectangular and triangular shapes are often utilized because of a large contact area with a gas and a great economy.

Such a catalyst for the NOx removal will become gradually poor in performance during its use in a combustion exhaust gas, and therefore if it is intended to keep its denitrating performance high, the exchange or recovery of the deteriorated catalyst will be necessary. The exchange of all the deteriorated catalysts for new ones is economically unbeneficial since the catalysts are expensive and their disposal also takes some cost. Accordingly, it is profitable to reuse the deteriorated catalysts by recovering them.

The inventors of the present application have intensively researched a performance drop phenomenon of the denitrating catalyst which has been used practically in a plant, and it has resultantly been found that the performance deterioration of the catalyst would mainly be attributable to the accumulation, on the catalyst, of alkaline components such as Na and K contained in the dust in the exhaust gas. The thus deteriorated catalyst can be recovered by water washing to remove Na and K, but its recovery degree is not so high as a performance of the new catalyst and hence such a washing recovery technique is not satisfactory.

The present inventors have found as a result of further investigations that the performance of the denitrating catalyst is closely connected to a sulfur content in the catalyst and the catalyst unsatisfactorily recovered by the washing operation contains a less amount of sulfur than in the unused new catalyst.

Thus, it has been confirmed that when the denitrating catalyst in which a performance has deteriorated was treated with at least one selected from the group consisting of $SO_4^{2-}$ compounds, sulfur compounds and sulfonic acid compounds in order to thereby replenish the catalyst with a sulfur content, the performance of the catalyst could be recovered effectively.

Further, in the case that an exhaust gas is treated at a temperature of 250° to 400° C. under the feed of ammonia by the use of the catalyst recovered by water washing, a treatment efficiency will be low at its initial stage and a certain period of time will elapse before its efficiency has reached the level in the vicinity of a design efficiency (a performance of the new catalyst) (which period will be hereinafter referred to, for simplification, as the induction period). Such a phenomenon will lead to the deterioration of the treatment efficiency and the ununiformity of the exhaust gas treatment. Therefore, if the induction period is shortened or desirably eliminated, the treatment efficiency will be able to always remain at a high level without temporarily lowering the effect and efficiency of the exhaust gas treatment, even when the recovered catalyst is used.

The present invention permits maintaining the treatment efficiency at a high level.

That is to say, the inventors of the present application have found that an effective performance recovery of the catalyst can be accomplished by first impregnating or spraying the deteriorated denitrating catalyst with an aqueous sulfuric acid solution, and calcining it in order to replenish the catalyst with a sulfur content.

The present inventors have found that the replenishment of the catalyst with a sulfur content can be carried out by previously treating the water-washed and thus recovered catalyst with an $SO_2$ gas prior to setting the catalyst in a denitrating apparatus; introducing the $SO_2$ gas into the apparatus in which the catalyst is set, prior to feeding the exhaust gas thereto; or introducing the $SO_2$ gas into the initially fed exhaust gas, whereby the performance of the catalyst can be effectively recovered, and the present invention has been completed.

Further, the present inventors have found that the replenishment of the catalyst with a sulfur content can be accomplished by first impregnating the water-washed catalyst with an aqueous ammonium hydrogensulfate solution and calcining it, whereby the performance of the catalyst can be effectively recovered, and the present invention has been completed.

Still further, the present inventors have found that the replenishment of the catalyst with a sulfur content can be accomplished by first impregnating the water-washed catalyst with an aqueous sulfamic acid solution and calcining it, whereby the performance of the catalyst can be effectively recovered, and the present invention has been completed.

An object of the present invention is to provide a method for recovering a deteriorated denitrating catalyst for ammonia catalytic reduction up to a performance level comparable to the new unused catalyst.

Another object of the present invention is to provide a method for recovering a denitrating catalyst for ammonia catalytic reduction which is capable of eliminating the above defined induction period.

Still another object of the present invention is to provide a method for recovering a denitrating catalyst for ammonia catalytic reduction which is characterized by treating the denitrating catalyst for ammonia catalytic reduction in which a performance has deteriorated, with at least one selected from the group consisting of $SO_4^{2-}$ compounds, sulfur compounds and sulfonic acid compounds in order to replenish the catalyst with a sulfur content.

For the sake of achieving the above-mentioned objects, the present invention comprises impregnating or spraying a deteriorated catalyst with an aqueous sulfuric acid solution, and calcining it. In other words, the present invention is directed to a method for recovering a denitrating catalyst for ammonia catalytic reduction which is characterized by first impregnating or spraying the worsen denitrating catalyst for ammonia catalytic reduction with an aqueous sulfuric acid solution, and then calcining it.

Further, for sake of achieving the above-mentioned objects, the present invention comprises subjecting a water-washed denitrating catalyst (recovered catalyst) to an $SO_2$ gas treatment. In other words, the present invention is directed to a method for recovering a denitrating catalyst for ammonia catalytic reduction which is characterized by feeding an $SO_2$ gas to the water-washed catalyst prior to feeding an exhaust gas thereto, or introducing the $SO_2$ gas into the initially fed exhaust gas.

Still further, for the sake of achieving the above-mentioned objects, a method for recovering a deteriorated catalyst according to the present invention comprises first washing the catalyst with water, impregnating or spraying the catalyst with an aqueous ammonium hydrogensulfate solution, and then calcining it, or directly dipping or spraying the deteriorated catalyst into or with an aqueous ammonium hydrogensulfate solution, and then calcining it. In other words, the present invention is directed to a method for recovering a denitrating catalyst which is characterized by first impregnating or spraying the deteriorated denitrating catalyst for ammonia catalytic reduction with an aqueous ammonium hydrogensulfate solution, and then calcining it.

Still further, for the sake of achieving the above-mentioned objects, a method for recovering a deteriorated catalyst according to the present invention comprises first washing the catalyst with water, impregnating or spraying it with an aqueous sulfamic acid solution, and then calcining it, or directly dipping or spraying the catalyst into or with the aqueous sulfamic acid solution and then calcining it. In other words, the present invention is directed a method for recovering a denitrating catalyst which is characterized by impregnating or spraying the deteriorated denitrating catalyst for ammonia catalytic reduction with the aqueous sulfamic acid solution and then calcining it.

In the above-mentioned methods, a temperature for the calcination is within the range of 300° to 650°C., preferably 300° to 400°C. A period of time for the calcination is such that a sufficient recovery is accomplished, and it is practically within the range of 30 minutes to 2 hours, and for example, the period of 1 hour or so is desirable.

The above-mentioned inventions are effective for catalysts containing $TiO_2$ as a main component, such as $TiO_2$-$V_2O_5$, $TiO_2$-$WO_3$-$V_2O_5$ and $TiO_2$-$WO_3$ catalysts.

Further, the respective inventions can be applied to the denitrating catalysts having optional shapes such as honeycomb, cylinder and plate.

In the case of the method in which an aqueous sulfuric acid solution is employed, after water washing, the catalyst may be impregnated or sprayed with the sulfuric acid component and be calcined, alternatively the deteriorated catalyst may directly be impregnated or sprayed with the sulfuric acid component and then be calcined.

Figure 2:
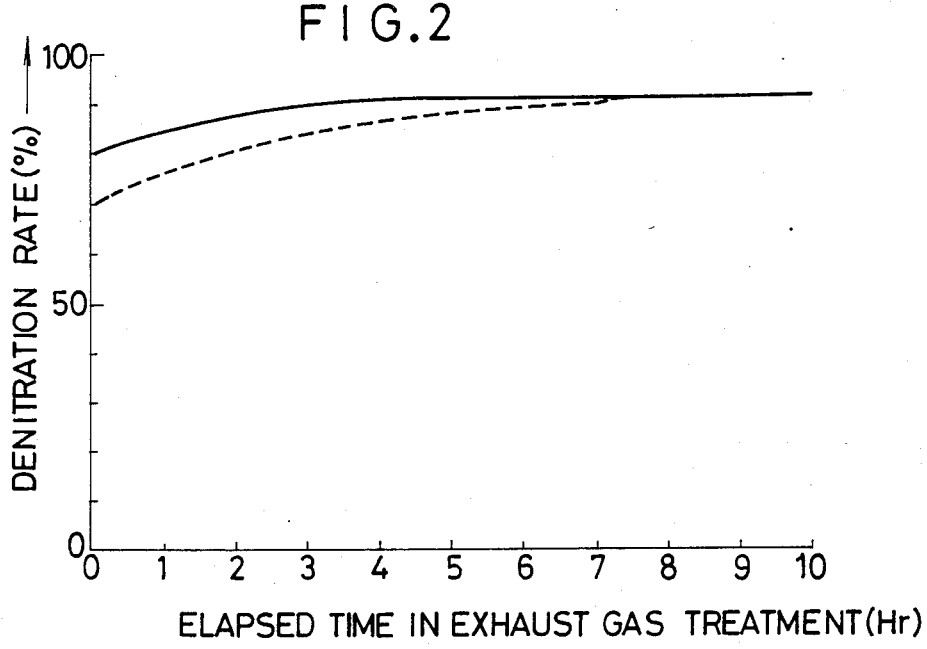
Figure 3:
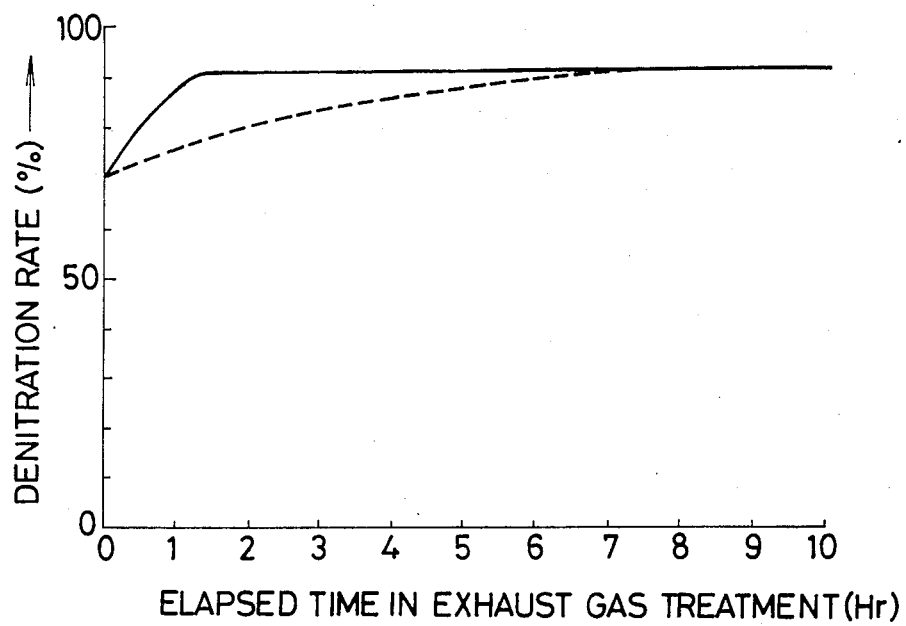

Now, the present invention will be described in detail as examples in reference to accompanying drawings, in which:

FIGS. 1, 2 and 3 show results of Examples 3, 4 and 5 of the present invention as well as comparative examples corresponding to them, and each abscissa axis therein represents an elapsed time in an exhaust gas treatment and each ordinate axis therein represents a denitration rate in terms of percent. In these drawings, solid and dotted lines indicate results of the present invention and comparative examples, respectively.

Figure 4:
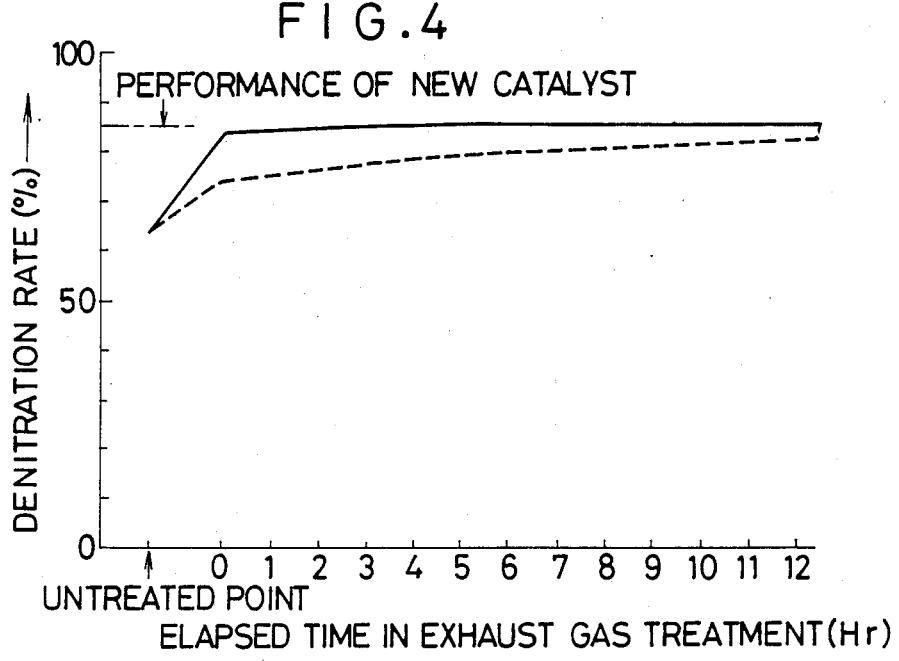

FIGS. 4 and 5 show results of Examples 6 and 7 of the present invention as well as comparative examples corresponding to them, and each abscissa axis therein represents an elapsed time in an exhaust gas treatment and each ordinate axis therein represents a denitration rate in terms of percent.

Figure 7:
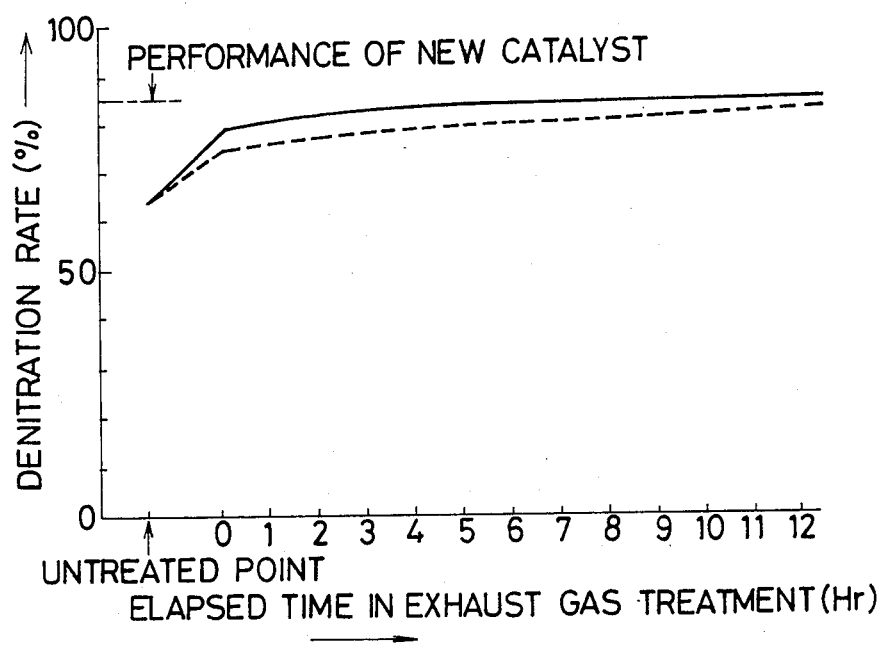

FIGS. 6 and 7 show results of Examples 8 and 9 of the present invention as well as comparative examples corresponding to them, and each abscissa axis therein represents an elapsed time in an exhaust gas treatment and each ordinate axis therein represents a denitration rate in terms of percent. In these drawings, solid and dotted lines indicate results of the present invention and comparative examples, respectively.

EXAMPLE 1

A $TiO_2$-$WO_3$-$V_2O_5$ catalyst (91% of $TiO_2$, 8% of $WO_3$ and 1% of $V_2O_5$) of a performance deterioration degree $K/Ko=0.63$ (K is a performance of the deteriorated catalyst or the catalyst to be recovered, and Ko is a performance of the new unused catalyst) was dipped into and washed with water for 60 minutes the volume of which was 5 times as much as that of the catalyst. As a result, the catalyst was recovered up to a level of $K/Ko=0.88$. The thus treated catalyst was further impregnated with a 1 N $H_2SO_4$ aqueous solution, and calcination was then carried out at 450° C. for 1 hour, so that the catalyst was recovered up to a level of $K/Ko=0.99$.

EXAMPLE 2

A deteriorated $TiO_2$-$WO_3$-$V_2O_5$ catalyst (89.7% of $TiO_2$, 10% of $WO_3$ and 0.3% of $V_2O_5$) of $K/Ko=0.50$ was dipped into a 1 N $H_2SO_4$ aqueous solution for 5 minutes and was air dried one night (16 hours), followed by calcination at 450° C. for 1 hour. As a result, the performance of the catalyst was recovered up to a level of $K/Ko=0.95$. Moreover, the similar catalyst was dipped into a 0.1 N $H_2SO_4$ aqueous solution for 5 minutes and was air dried one night (16 hours), followed by calcination at 450° C. for 1 hour. Thereby, the performance of the catalyst was recovered up to a level of $K/Ko=0.93$.

As be definite from the foregoing, when the deteriorated catalyst is impregnated or sprayed with the aqueous sulfuric acid solution and is then calcined, an extremely great recovery effect can be obtained. Thus, the catalyst can be repeatedly utilized by the recovery treatment, whereby a cost of the catalyst used in a denitrating apparatus can be decreased to a substantial degree.

EXAMPLE 3

A $TiO_2$-$WO_3$-$V_2O_5$ catalyst (91% of $TiO_2$, 8% of $WO_3$ and 1% of $V_2O_5$) in which a denitrating performance had deteriorated was dipped into and washed with water the volume of which was 5 times as much as that of the catalyst, at ordinary temperature for 60 minutes, and it was put in a drying oven and the catalyst was then dried at 110° C. for 8 hours. Simultaneously with this drying operation, a gas containing 1,000 ppm of an $SO_2$ gas was introduced into the drying oven. The catalyst which had been subjected to the recovery treatment was set in a denitrating apparatus, and a denitrating performance was measured under test conditions shown in Table 1. A relation between an elapsed time in the exhaust gas treatment and a denitration rate is represented by a solid line in FIG. 1. For comparison, the catalyst which had been recovered with the dip water washing but had not undergone the $SO_2$ treatment was also tested for the denitrating performance under the same conditions as in Table 1, andd the test results are denoted by a dotted line in FIG. 1.

The denitration rate referred to in the above-mentioned and undermentionedd examples means a value obtained from the formula $((A-B)/A)\times 100$ (%) wherein A is a concentration of a nitrogen oxide at an inlet of the catalyst layer and B is that of the nitrogen oxide at an outlet of the catalyst layer.

The results in FIG. 1 make it definite that the present invention can eliminate the induction period by virtue of the $SO_2$ gas treatment.

TABLE 1

| Test conditions | |
| --- | --- |
| Amount of catalyst | 50 mm × 50 mm × 900 mmL |
| Amount of gas | 20 $Nm^3/H$ |
| Temperature | 380° C. |
| $NH_3/NOx$ ratio | 1.00 |
| Gas composition: | |
| NOx | 100 ppm |
| $O_2$ | 2% |
| $SO_2$ | 200 ppm |
| $CO_2$ | 10% |
| $H_2O$ | 10% |

EXAMPLE 4

A $TiO_2$-$WO_3$-$V_2O_5$ catalyst (89.5% of $TiO_2$, 10% of $WO_3$ and 0.5% of $V_2O_5$) in which a denitrating performance had deteriorated was dipped into and washed with water the volume of which was 5 times as much as that of the catalyst, at ordinary temperature for 60 minutes, and drying was then carried out at 110° C. for 8 hours. The thus treated catalyst was set in a denitrating apparatus, and a gas containing 1,000 ppm of an $SO_2$ gas was introduced into the apparatus for 1 hour. Next, the apparatus was operated under test conditions shown in Table 1 given above to measure a performance of the catalyst. A relation between an elapsed time in the exhaust gas treatment and a denitration rate is represented by a solid line in FIG. 2. For comparison, the catalyst which had been recovered with the dip water washing but had not undergone the $SO_2$ treatment was also tested for a denitrating performance under the same conditions as in Table 1, and the test results are denoted by a dotted line in FIG. 2. From the results in FIG. 2, it is apparent that the induction period can be shortened remarkably by carrying out the $SO_2$ gas treatment regarding the present invention prior to introducing the exhaust gas into the denitrating apparatus in which the water-washed and thereby recovered catalyst is set.

EXAMPLE 5

A $TiO_2WO_3$ catalyst (90% of $TiO_2$ and 10% of $WO_3$) in which a denitrating performance had deteriorated was dipped into and washed with water the volume of which was 5 times as much as that of the catalyst, at ordinary temperature for 60 minutes, and drying was then carried out at 110° C. for 8 hours. The thus treated catalyst was set in a denitrating apparatus. An $SO_2$ gas was introduced into a test gas shown in Table 1 above so that the test gas might contain 3,000 ppm of the $SO_2$ gas, and the prepared test gas was caused to pass through the catalyst layer in order to accomplish a recovery treatment. At the time when a denitration rate had reached 80%, the introduction of the $SO_2$ gas was stopped. A relation between an elapsed time in the exhaust gas treatment and a denitration rate is represented by a solid line in FIG. 3. For comparison, the catalyst which had been recovered with the dip water washing but had not undergone the $SO_2$ treatment was also tested for a denitrating performance under the same conditions as in Table 1, and the test results are denoted by a dotted line in FIG. 3. According to the results represented by curves in FIG. 3, it is clear that the effect of the present invention is remarkable.

As be definite from the foregoing, the induction period (in the case that an exhaust gas is treated under the feed of ammonia by the use of the catalyst recovered by water washing, a treatment efficiency will be low at an initial stage of the treatment and a certain period of time will elapse before its efficiency has reached the level in the vicinity of a design efficiency) can be eliminated or shortened by subjecting the water-washed denitrating catalyst to the $SO_2$ gas treatment, whereby the drop of the treatment efficiency at the early stage and the ununiformity of the exhaust gas treatment can be overcome.

EXAMPLE 6

A $TiO_2$-$WO_3$-$V_2O_5$ catalyst (91% of $TiO_2$, 8% of $WO_3$ and 1% of $V_2O_5$), in which a denitrating performance had deteriorated by being exposed in an exhaust gas from an A heavy oil-fired boiler for 16,000 hours, was dipped into and washed with water the volume of which was 5 times as much as that of the catalyst, at ordinary temperature for 60 minutes, and drying was then carried out at 110° C. for 3 hours. The thus catalyst was further impregnated with a 1 (mol/l) aqueous ammonium hydrogensulfate solution and was then calcined at 350° C. for 1 hour. A denitration performance was measured for the recovered catalyst under test conditions shown in Table 1. A relation between an elapsed time in the exhaust gas treatment and a denitration rate is represented by a solid line in FIG. 4. For comparison, the catalyst which had been recovered with the dip water washing but had not undergone the ammonium hydrogensulfate impregnation was also tested for a denitrating performance under the same conditions as in Table 1, and the test results are denoted by a dotted line in FIG. 4. The results in this drawing clearly indicate that the induction period can be eliminated by impregnating the catalyst with the aqueous ammonium hydrogensulfate solution regarding the present invention.

TABLE 2

| Test conditions | |
| --- | --- |
| Amount of catalyst | 15 mm × 15 mm × 100 mmL, Square honeycomb (orifice diam. = 7.4 mm, wall thickness = 1.1 mm) |
| Amount of gas | 220 Nl/H |
| Temperature | 360° C. |
| $NH_3/NOx$ ratio | 1.00 |
| Gas composition: | |
| NOx | 200 ppm |
| $O_2$ | 2.0% |
| $SO_2$ | 200 ppm |
| $CO_2$ | 12.0% |
| $H_2O$ | 9.1% |

EXAMPLE 7

A $TiO_2$-$WO_3$-$V_2O_5$ catalyst (89.2% of $TiO_2$, 9.4% of $WO_3$ and 1.4% of $V_2O_5$) in which a denitrating performance had deteriorated was dipped into a 0.2 (mol/l) aqueous ammonium hydrogensulfate solution for 60 minutes the volume of which was 5 times as much as that of the catalyst, and drying was then carried out at 110° C. for 3 hours, followed by calcination at 350° C. for 1 hour. A denitration performance was measured for the thus recovered catalyst under test conditions shown in Table 2. A relation between an elapsed time in the exhaust gas treatment and a denitration rate is represented by a solid line in FIG. 5. For comparison, the catalyst which had been recovered with the dip water washing was also tested for a denitrating performance under the same conditions as in Table 2, and the test results are denoted by a dotted line in FIG. 5. This drawing makes it apparent that the dip recovery by the use of the aqueous ammonium hydrogensulfate solution regarding the present invention can shorten the induction period more noticeably as compared with a usual water washing recovery technique.

EXAMPLE 8

A $TiO_2$-$WO_3$-$V_2O_5$ catalyst (91% of $TiO_2$, 8% of $WO_3$ and 1% of $V_2O_5$), in which a denitrating performance had deteriorated by being exposed in an exhaust gas from an A heavy oil-fired boiler for 1,600 hours, was dipped into and washed with water the volume of which was 5 times as much as that of the catalyst, at ordinary temperature for 60 minutes, and drying was then carried out at 110° C. for 3 hours. The thus catalyst was further impregnated with a 1 N aqueous sulfamic acid solution and was then calcined at 350° C. for 1 hour. A denitration performance was measured for the recovered catalyst under test conditions shown in Table 2. A relation between an elapsed time in the exhaust gas treatment and a denitration rate is represented by a solid line in FIG. 6. For comparison, the catalyst which had been recovered with the dip washing but had not undergone the sulfamic acid impregnation was also tested for a denitrating performance under the same conditions as in Table 2, and the test results are denoted by a dotted line in FIG. 6. The results in this drawing clearly indicate that the induction period can be eliminated by impregnating the catalyst with the aqueous sulfamic acid solution regarding the present invention.

EXAMPLE 9

A $TiO_2$-$WO_3$-$V_2O_5$ catalyst (89.2% of $TiO_2$, 9.4% of $WO_3$ and 1.4% of $V_2O_5$) was dipped into a 0.2 (mol/l) aqueous sulfamic acid solution the volume of which was 5 times as much as that of the catalyst for 60 minutes, and drying was then carried out at 110° C. for 3 hours, followed by calcination at 350° C. for 1 hour. A denitration performance was measured for the recovered catalyst under test conditions shown in Table 2. A relation between an elapsed time in the exhaust gas treatment and a denitration rate is represented by a solid line in FIG. 7. For comparison, the catalyst which had been recovered with the dip water washing was also tested for a denitrating performance under the same conditions as in Table 2, and the test results are denoted by a dotted line in FIG. 7. The results in this drawing clearly indicate that the induction period can be shortened more noticeably by dipping the catalyst into the aqueous sulfamic acid solution regarding the present invention, as compared with the case where the recovery is carried out by the usual water washing technique.

We claim:

1. A method for recovering a denitrating catalyst for ammonia catalytic reduction consisting essentially of treating a $TiO_2$-containing denitrating catalyst of reduced catalytic activity for ammonia catalytic reduction with at least one agent selected from the group consisting of aqueous sulfuric acid, aqueous ammonium hydrogen sulfate, aqueous sulfamic acid and mixture thereof for sufficient time and calcining said catalyst at a temperature ranging from 300° to 650° C. to replenish said catalyst with a sulfur content.

2. The method according to claim 1 of treating said catalyst by impregnating or spraying with an aqueous sulfuric acid solution and then calcining said catalyst.

3. The method according to claim 1 of treating said catalyst by impregnating or spraying with an aqueous ammonium hydrogensulfate solution and then calcining said catalyst.

4. The method according to claim 1 of treating said catalyst by impregnating or spraying with an aqueous sulfamic acid solution and then calcining said catalyst.

5. A method for recovering a denitrating catalyst for ammonia catalystic reduction consisting essentially of treating a $TiO_2$-containing denitrating catalyst of reduced catalytic activity for ammonia catalytic reduction by washing with water, and then feeding $SO_2$ gas to said catalyst prior to feeding exhaust gas thereto or introducing said $SO_2$ gas into initially fed exhaust gas while drying the water washed catalyst.

* * * * *